(12) United States Patent  
Benveniste

(10) Patent No.: US 8,254,336 B1  
(45) Date of Patent: Aug. 28, 2012

(54) MULTIPLE DISTINCT PHYSICAL CHANNELS FOR MESH CONTROL

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 981 days.

(21) Appl. No.: 11/406,451

(22) Filed: Apr. 18, 2006

Related U.S. Application Data

(60) Provisional application No. 60/672,058, filed on Apr. 18, 2005.

(51) Int. Cl.
*H04W 4/00* (2009.01)
*H04L 12/28* (2006.01)

(52) U.S. Cl. ........................................ 370/332; 370/431
(58) Field of Classification Search .................. 370/431
See application file for complete search history.

(56) References Cited

U.S. PATENT DOCUMENTS

| | | | | |
|---|---|---|---|---|
| 5,845,211 | A * | 12/1998 | Roach, Jr. ..................... | 455/436 |
| 2001/0014608 | A1 * | 8/2001 | Backstrom et al. ............ | 455/450 |
| 2002/0097696 | A1 * | 7/2002 | Kossi et al. ................... | 370/330 |
| 2002/0126635 | A1 * | 9/2002 | Sugiyama et al. ............ | 370/329 |
| 2002/0156722 | A1 * | 10/2002 | Greenwood .................... | 705/37 |
| 2004/0037247 | A1 * | 2/2004 | Ngo .............................. | 370/332 |
| 2004/0203828 | A1 * | 10/2004 | Mirchandani et al. ..... | 455/452.1 |
| 2004/0236547 | A1 * | 11/2004 | Rappaport et al. ................ | 703/2 |
| 2004/0266351 | A1 * | 12/2004 | Chuah et al. .................... | 455/62 |
| 2005/0100029 | A1 * | 5/2005 | Das .............................. | 370/401 |
| 2006/0121854 | A1 * | 6/2006 | Abhishek et al. ............ | 455/63.1 |
| 2006/0223442 | A1 * | 10/2006 | Stephens .................... | 455/67.11 |

* cited by examiner

*Primary Examiner* — John Blanton
(74) *Attorney, Agent, or Firm* — Chapin IP Law, LLC

(57) ABSTRACT

A method and apparatus for interference avoidance from independent systems in a mesh in presented. A first Mesh Point (MP) operating on a same channel as an independent Access Point (AP) avoids mesh traffic channels serving the independent AP by switching the mesh traffic channel used by the first MP, and may also request a change of control channel for the first MP. The mesh network may include a plurality of sub-meshes operating on different control channels, wherein one mesh point is common to any two sub-meshes, the common mesh point having at least two radios and uses one of its radios for control traffic exchanged one sub-mesh, and another radio for control traffic exchanged with another sub-mesh and wherein mesh traffic to or from the mesh point common to any two sub-meshes can use either of the two channels.

18 Claims, 7 Drawing Sheets

MULTIPLE DISTINCT PHYSICAL CHANNELS FOR MESH CONTROL

CROSS REFERENCE TO RELATED APPLICATIONS

The present application claims the benefit of U.S. Provisional Patent Application No. 60/672,058, filed on Apr. 18, 2005, which is incorporated herein by reference.

BACKGROUND

This patent application refers to meshes and provides techniques showing how different control channels can be used to connect multiple MPs in a mesh. In certain scenarios there may be a requirement for changing a control channel in real time, using different physical channels in different parts of the mesh because of interference experienced in different parts if the mesh network, and using multiple control channels to accommodate clusters of single radio MPs each using different channel.

SUMMARY

Conventional mechanisms such as those explained above suffer from a variety of deficiencies. In certain environments, interference can be caused by independent 802.11 systems operating on the same RF spectrum. This may result in two types of interference, those operating on channels used for mesh traffic, and those operating on the mesh control channel.

Embodiments of the invention significantly overcome such deficiencies and provide mechanisms and techniques for interference avoidance from independent systems in a mesh. Mesh traffic channels serving independent co-channel users are avoided by limiting channel selection within a set of permissible channels for each mesh point. The control channel can be changed or "spliced" to operate on two different physical channels in order to avoid interference from mesh-independent stations. There may be a requirement for changing a control channel in real time, using different physical channels in different parts of the mesh because of interference experienced in different parts if the mesh network, and using multiple control channels to accommodate clusters of single radio MPs each using different channel.

In a particular embodiment of a method for interference avoidance from independent systems in a mesh, a first Mesh Point (MP) operating on a same channel as an independent Access Point (AP) avoids mesh traffic channels serving the independent AP by switching the mesh traffic channel used by the first MP, and may also request a change of control channel for the first MP.

Still other embodiments include a system including one or more devices configured to process all the method operations disclosed herein as embodiments of the invention. In such embodiments, the device may include a memory system, a processor, communications interface in an interconnection mechanism connecting these components. The memory system is encoded with a process that provides mechanisms and techniques for interference avoidance from independent systems in a mesh as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing mechanisms and techniques for interference avoidance from independent systems in a mesh as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
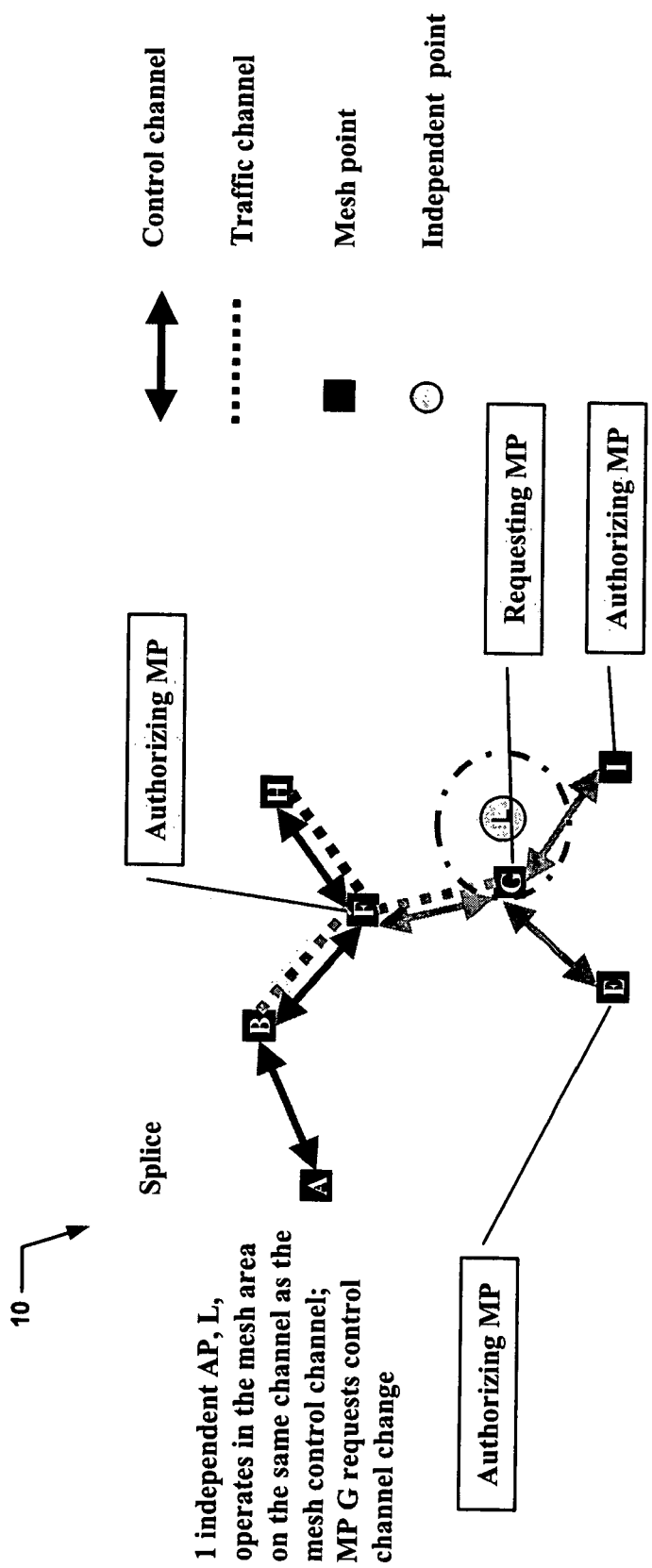
FIG. 1 comprises a block diagram of a first environment showing a mesh network having nodes using two different control channels and an independent AP.

Referring to FIG. 1, a first mesh environment 10 is shown. This mesh environment 10 includes a plurality of mesh points (A, B, E, F, G, H and I), which comprise a mesh consisting of sub-meshes operating on different control channels. One sub-mesh consists of mesh points E, F, G, and the other sub-mesh consists of mesh points A, B, F, and H. What enables different sub-meshes that use different control channels to be fully connected is that there exists one mesh point common to any two sub-meshes that has at least two radios. Mesh points A, E, and I have a single radio each, while mesh points B, F, G, and H have two radios each. In the configuration depicted here, mesh point F is the common mesh point in the two sub-meshes. MP F uses one of its radios for control traffic exchanged with MPs E and G, and another radio for control traffic exchanged with MPs B and H. Mesh traffic to or from MP F can use either of the two channels. Multiple reasons can lead to this type of channel assignment. One example is the emergence of an independent Access Point L, which uses the same channel as the control channel of sub-mesh comprising mesh points A, B, F, and H. Another reason for using different control channel in a mesh includes decreasing the load on the control channel, especially when there are many single radio MPs associated with the mesh.

APs that are independent of a mesh may operate in the neighborhood of mesh points on the same channel. As a consequence the channel should be avoided as either a control channel or a mesh traffic channel. A "permissible" set of channels is maintained by an MP; the MP select its MT (data) channels from the permissible set of channels.

The permissible set contains channels that are not heavily loaded with non-mesh traffic or traffic from a non-mesh-associated BSS. Channels are monitored regularly in order to avoid such channels from being included in the permissible set, which is updated over time. If an independent AP powers on and chooses to operate on one of the permissible channels, that channel is removed from the permissible set.

A NAV is maintained by a MP on all channels on the permissible set. The NAV of a channel is updated by NAV setting requests for the channel reserved transmitted on the control channel, and by NAV setting requests transmitted on each traffic channel by any stations/APs that may be operating on that channel and are received by a MT radio while tuned to that channel. If the MP has a fixed MT channel assigned to it, it will be synchronized with all NAV setting requests on the MT channel.

When a MP switches MT channels, collisions are possible if the MRTS asks for such a channel before the latter is removed from the permissible set. The MP performs carrier sensing before transmitting and will back off to avoid such collisions. NAV synchronization can be achieved with greater probability by tuning to the MT channel before the MP is ready to transmit. Tuning should occur no later than the generation and queuing of a MRTS or MCTS. Independent APs operating in the mesh area, on the same channel as the mesh control channel, may force a nearby MP to request a change of the control channel. Such a change is accommodated either by forwarding the control channel change request to all MPs, or by "splicing" the channel.

A MP may send requests to its mesh neighbors for permission to use a different control channel. IN the environment 10, MP G (the requesting MP) will send a request to its mesh neighbors MPs EFI (Authorizing MPs) to change the control channel to avoid interference with AP L.

If the request is authorized, the requesting MP (MP G) will tune its control radio to the requested channel. If an authorizing MP (E, F and I) has no other mesh neighbors, it will tune its control radio to the requested channel. If an authorizing MP has other mesh neighbors it will tune a MT radio to the requested control channel. In that case, if the authorizing MP has no additional MT radios, it will use the control channels for mesh traffic to its mesh neighbors.

When a MP receives a request for control channel change, it may accept the request, forward the request, or decline the request. A MP that accepts or declines a request or receives notice that a request it forwarded is accepted will notify the mesh neighbor from which it received the request. A MP will consider its own or forwarded request accepted if all mesh neighbors to which it sent the request indicate that the request is accepted. A request is authorized if it is considered accepted by the requesting MP. If a request is authorized, a MP that forwarded or submitted an authorized request will tune its control radio to the requested channel, if a MP that accepted an authorized request has no mesh neighbors other the MP that sent the request, it will tune its control radio to the requested channel, and if an authorizing MP has mesh neighbors other than the MP that sent it the request it will tune a MT radio to the requested control channel and use it for control traffic. In that case, if the authorizing MP has no additional MT radios, it will use the control channels for mesh traffic to its mesh neighbors. If the request is not authorized, the requesting MP may resubmit a request for a different control channel.

Figure 2:
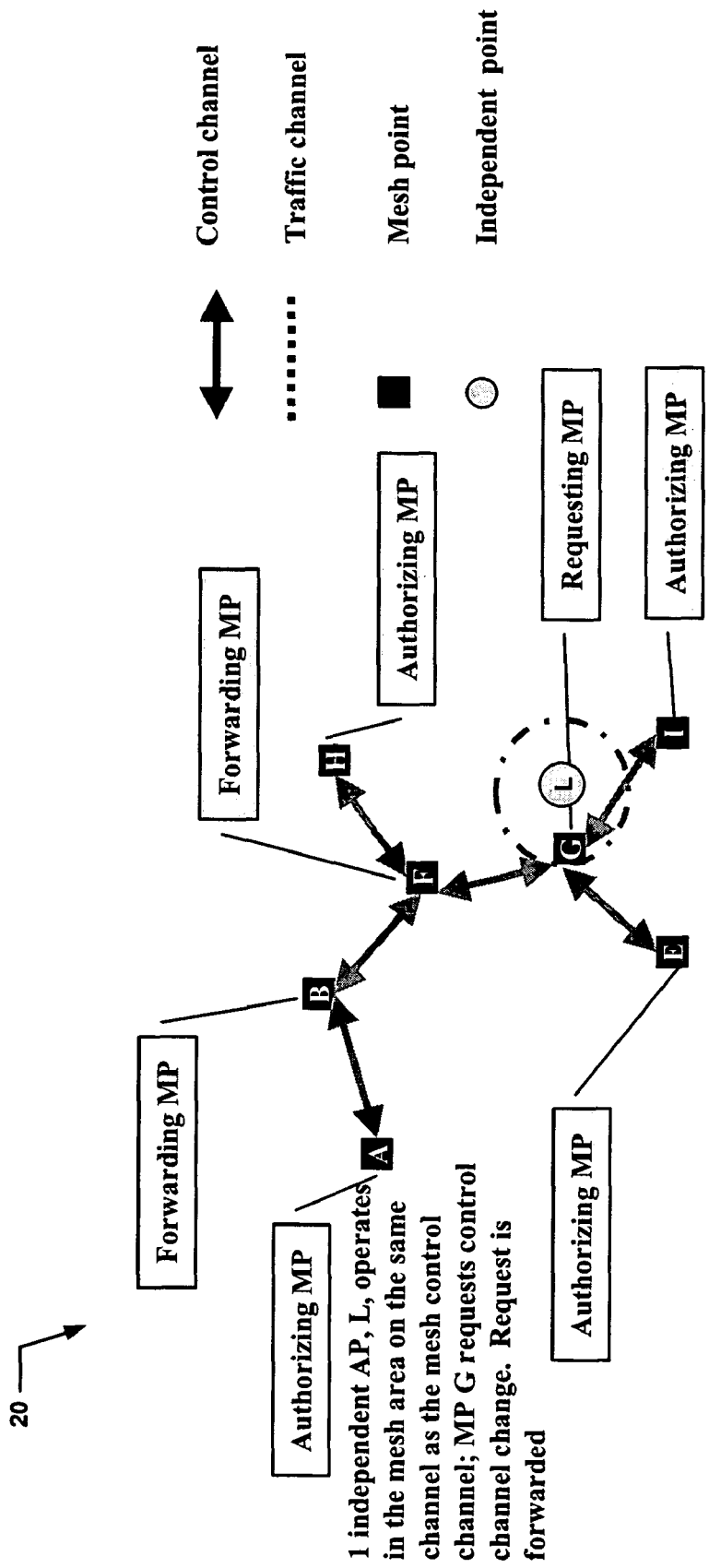
FIG. 2 comprises a block diagram of a second environment showing a mesh network having nodes using a single control channel and an independent AP.

Referring now to FIG. 2, a second mesh environment 20 is shown. This mesh environment 20 includes a plurality of mesh points (A, B, E, F, G, H and I) and an independent Access Point L. In this environment MP E shares a control channel with MP G and MP I shares the same control channel with MP G. MPs E and I have only a single radio, and thus transmit control channel information and data traffic over the same channel. MP G shares the same control channel with MP F. MP F shares the same control channel with MP B and with MP H. MP A shares the same control channel with MP B as M P B shares with MP F. AP L operates in the mesh area on the same channel as the mesh control channel used by MP G. Alternatively, a request to vacate the control channel for other reasons through DFS has been issued. This request is initiated by MP G.

In the environment 20, MP G (the requesting MP) will send a request to its mesh neighbors MPs E, F, and I (Authorizing MPs) to change the control channel to avoid interference with AP L. IN this environment, MP F has additional mesh neighbors on the same control channel, thus MP F acts as a forwarding MP and forwards the request to its other neighbors, MPs B and H. MP H has no other neighbors so MP H is an Authorizing node, while MP B has another mesh neighbor (MP A) so MP B acts as a forwarding node to MP A and MP A is an Authorizing node, as MP A has no other mesh neighbors.

If the request is authorized, the requesting MP (MP G) will tune its control radio to the requested channel. When an authorizing MP (E, I, H and A) has no other mesh neighbors, it will tune its control radio to the requested channel. If an authorizing MP has other mesh neighbors it will tune a MT radio to the requested control channel. In that case, if the authorizing MP has no additional MT radios, it will use the control channels for mesh traffic to its mesh neighbors.

Figure 3:
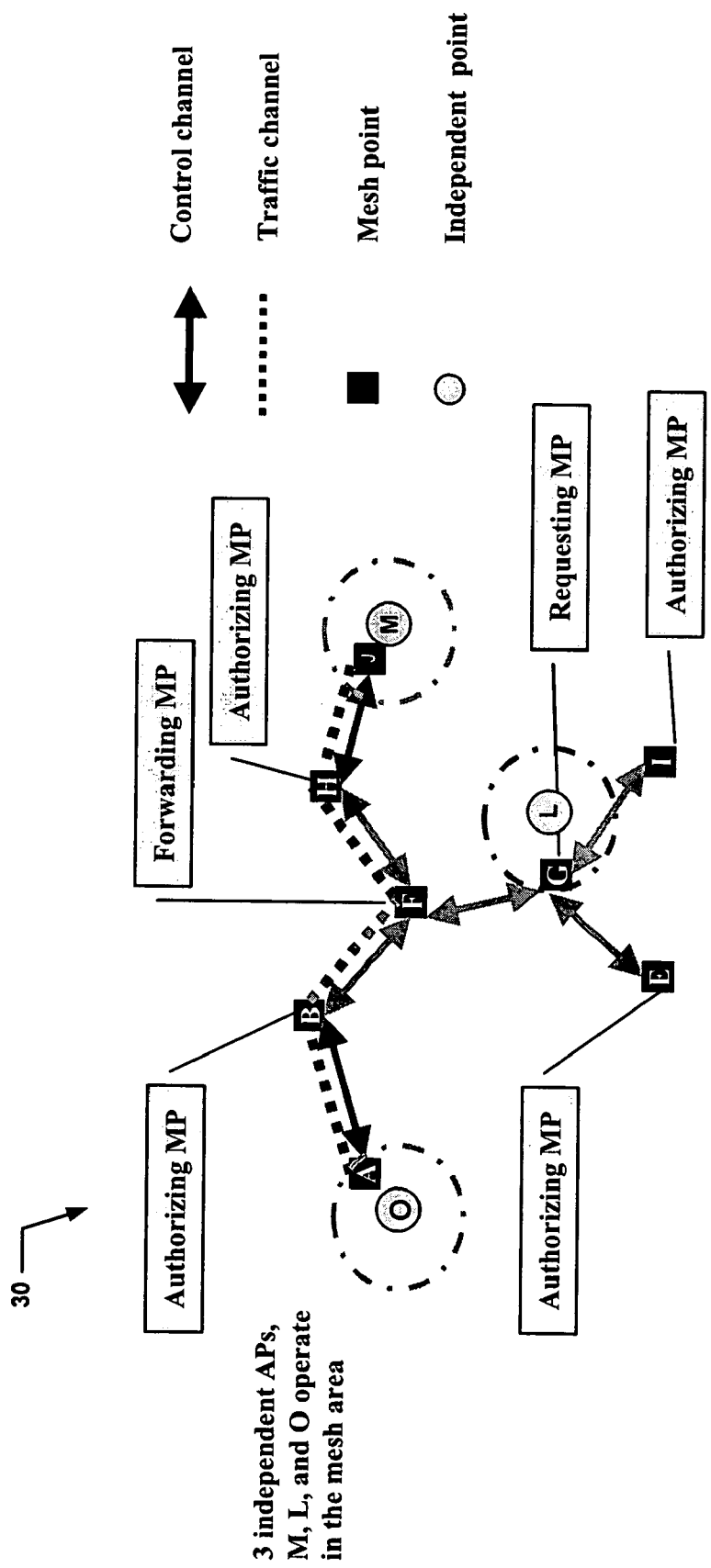
FIG. 3 comprises a block diagram of a third environment showing a mesh network having nodes using two different control channels, two different data channels and three independent APs.

Referring now to FIG. 3, a third mesh environment 30 is shown. This mesh environment 30 includes a plurality of mesh points (A, B, E, F, G, H, I and J) and an independent Access Points L, M and O. In this environment MP E shares a control channel with MP G and MP I shares the same control channel with MP G. MPs E and I have only a single radio, and thus transmit control channel information and data traffic over the same channel. MP G shares the same control channel with MP F. MP F shares the same control channel with MP B and with MP H. MP A shares a different channel with MP B as MP B shares with MP F. MP H shares a same control channel as the one shared by MP A and MP B, with MP J.

AP L operates in the mesh area on the same channel as the mesh control channel used by MP G. AP M operates in the mesh area on the same channel as the mesh control channel and the data channel used by MP I. AP O operates in the mesh area on the same channel as the mesh control channel and the data control channel used by MP A. In the environment 30, MP G (the requesting MP) will send a request to its mesh neighbors MPs E, F, and I (Authorizing MPs) to change the control channel to avoid interference with AP L. In this environment, MP F has additional mesh neighbors on the same control channel, thus MP F acts as a forwarding MP and forwards the request to its other neighbors, MPs B and H. MP H has no other neighbors using the same channel so MP H is an Authorizing node. MP B has no other mesh neighbor using the same channel as MP F so MP B acts as an Authorizing node, MP A has no other mesh neighbors.

If the request is authorized, the requesting MP (MP G) will tune its control radio to the requested channel. When an authorizing MP (E, I H and A) has no other mesh neighbors, it will tune its control radio to the requested channel. If an authorizing MP has other mesh neighbors it will tune a MT radio to the requested control channel. In that case, if the authorizing MP has no additional MT radios, it will use the control channels for mesh traffic to its mesh neighbors.

MP A may wish to change its control channel and its traffic channel due to potential interference provided by AP O. Similarly, MP J may wish to change its control channel and its traffic channel due to potential interference provided by AP M. Each of MP A and J would perform the selecting a different traffic channel fro man available set of channels for that MP as well as requesting for a control channel change, as described above.

Figure 4A:
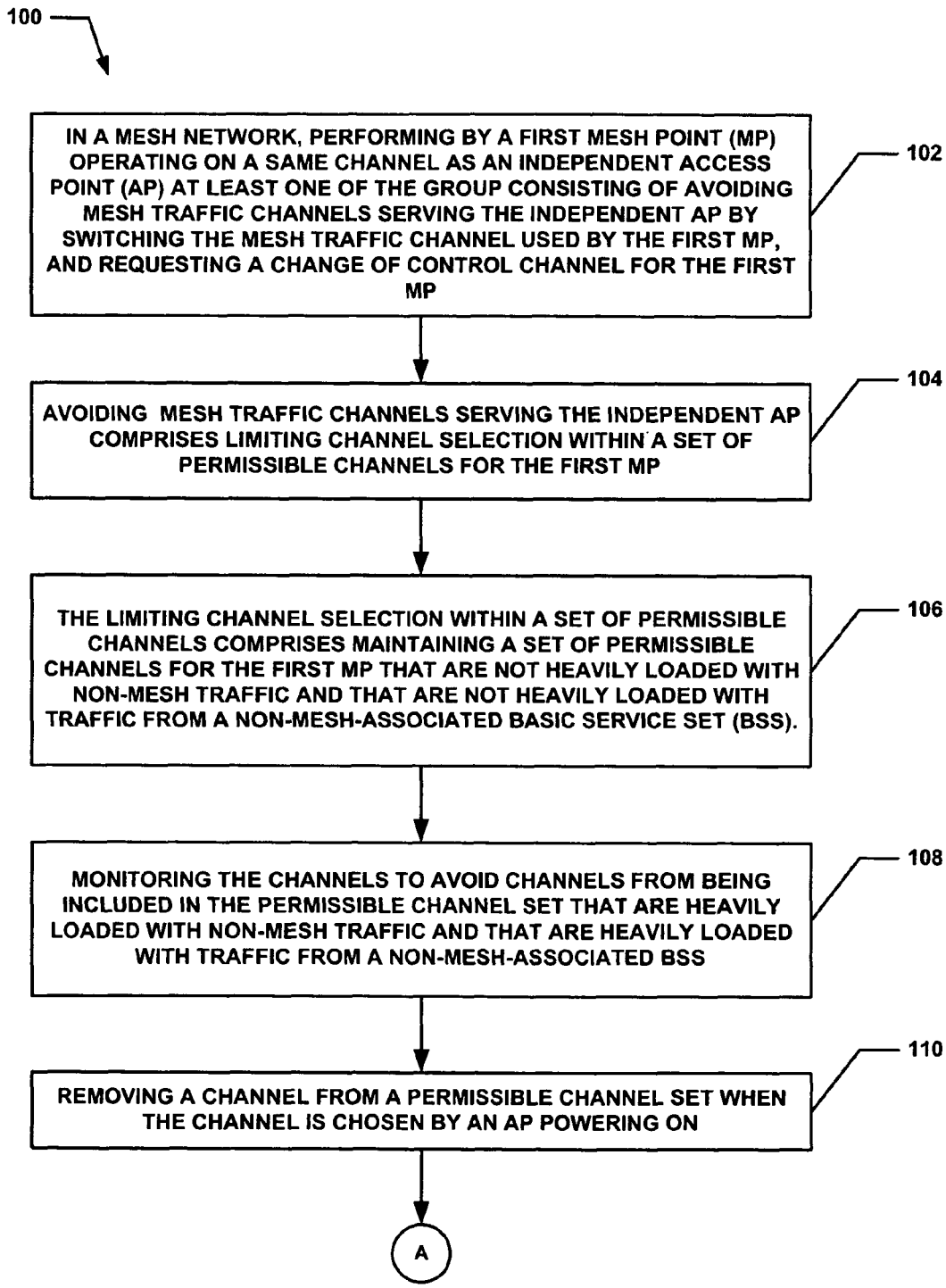
FIGS. 4A-4c comprise a flow chart of a particular embodiment of a method of performing interference avoidance from independent systems in a mesh in accordance with embodiment of the invention.
Figure 4B:
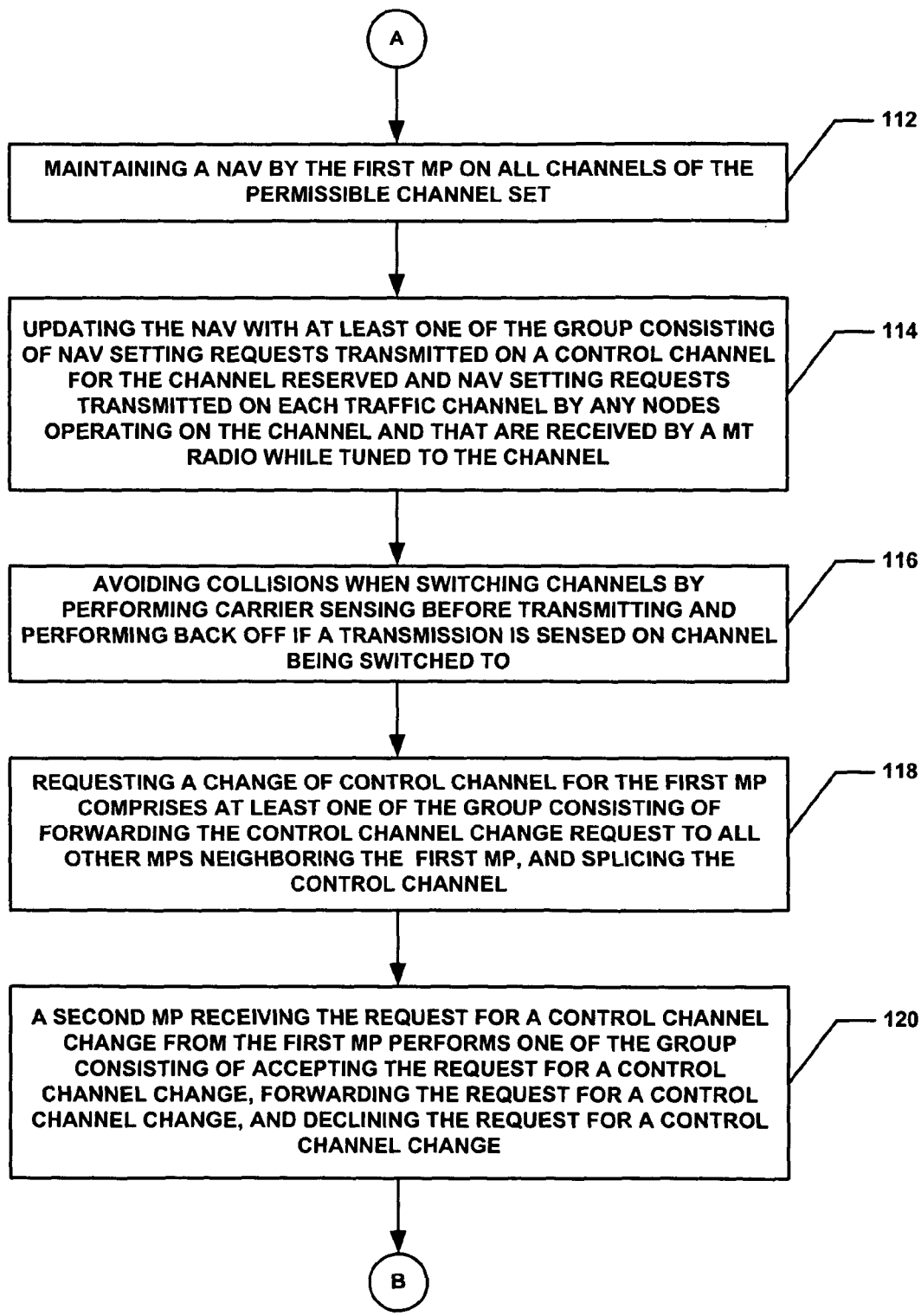
Figure 4C:
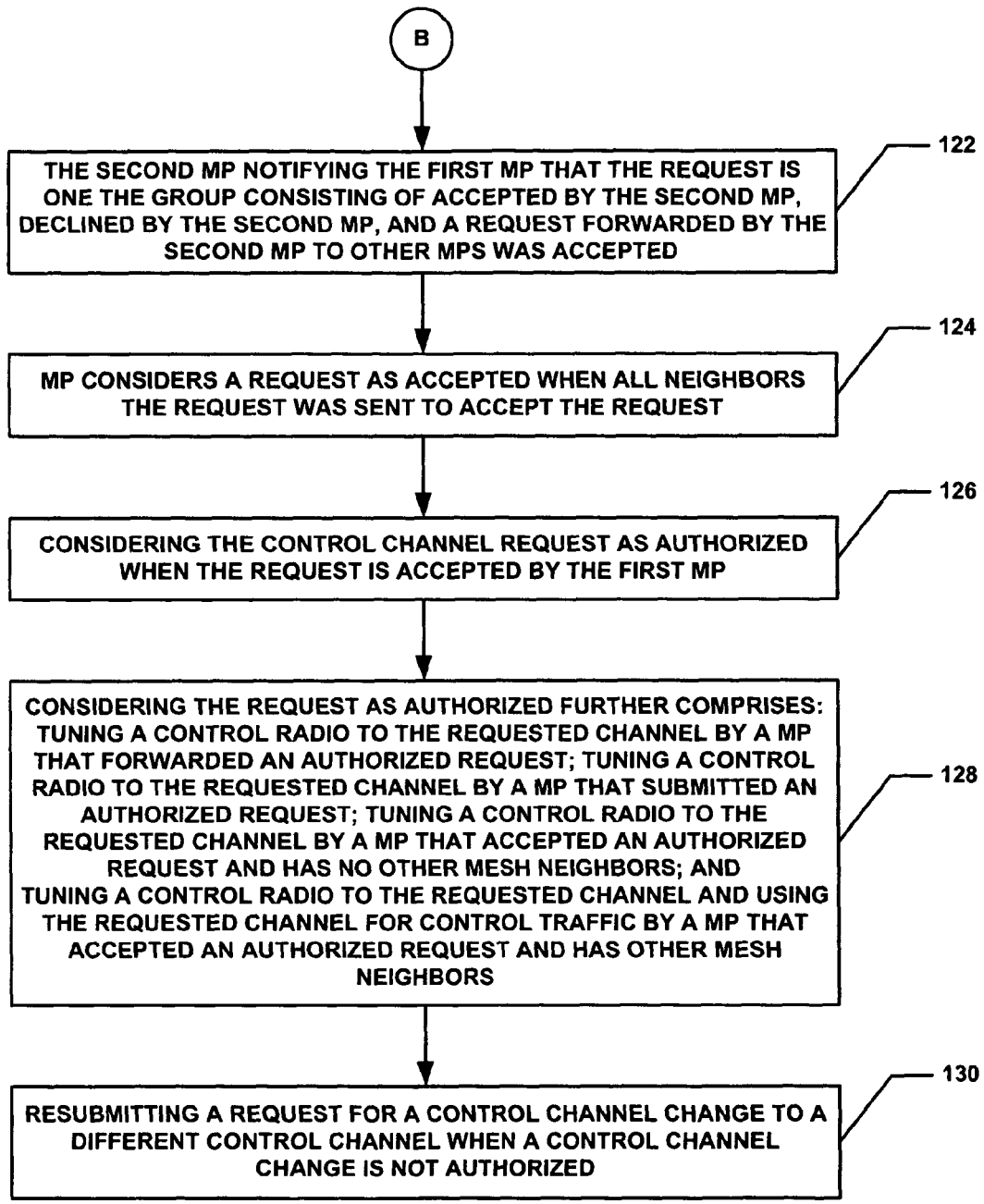

A flow chart of a particular embodiment of a method for performing channel access coordination in a wireless mesh is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

In a particular embodiment, the method 100 of avoiding interference from independent stations in a mesh starts with processing block 102 which discloses in a mesh network, performing by a first Mesh Point (MP) operating on a same channel as an independent Access Point (AP) at least one of the group consisting of avoiding mesh traffic channels serving the independent AP by switching the mesh traffic channel used by the first MP, and requesting a change of control channel for the first MP.

Processing block 104 states avoiding mesh traffic channels serving the independent AP comprises limiting channel selection within a set of permissible channels for the first MP.

Processing block 106 recites wherein the limiting channel selection within a set of permissible channels comprises maintaining a set of permissible channels for the first MP that are not heavily loaded with non-mesh traffic and that are not heavily loaded with traffic from a non-mesh-associated Basic Service Set (BSS).

Processing block 108 discloses monitoring the channels to avoid channels from being included in the permissible channel set that are heavily loaded with non-mesh traffic and that are heavily loaded with traffic from a non-mesh-associated BSS. Processing block 110 states removing a channel from a permissible channel set when the channel is chosen by an AP powering on.

Processing continues with processing block 112 which recites maintaining a NAV by the first MP on all channels of the permissible channel set.

Processing block 114 discloses updating the NAV with at least one of the group consisting of NAV setting requests transmitted on a control channel for the channel reserved and NAV setting requests transmitted on each traffic channel by any nodes operating on the channel and that are received by a MT radio while tuned to the channel.

Processing block 116 states avoiding collisions when switching channels by performing carrier sensing before transmitting and performing back off if a transmission is sensed on channel being switched to.

Processing block 118 discloses the requesting a change of control channel for the first MP comprises at least one of the group consisting of forwarding the control channel change request to all other MPs neighboring the first MP, and splicing the control channel.

Processing block 120 recites wherein a second MP receiving the request for a control channel change from the first MP performs one of the group consisting of accepting the request for a control channel change, forwarding the request for a control channel change, and declining the request for a control channel change.

Processing continues at processing block 122 which discloses the second MP notifying the first MP that the request is one the group consisting of accepted by the second MP, declined by the second MP, and a request forwarded by the second MP to other MPs was accepted.

Processing block 124 states an MP considers a request as accepted when all neighbors the request was sent to accept the request.

Processing block 126 recites considering the control channel request as authorized when the request is accepted by the first MP.

Processing block 128 discloses considering the request as authorized further comprises tuning a control radio to the requested channel by a MP that forwarded an authorized request; tuning a control radio to the requested channel by a MP that submitted an authorized request; tuning a control radio to the requested channel by a MP that accepted an authorized request and has no other mesh neighbors; and tuning a control radio to the requested channel and using the requested channel for control traffic by a MP that accepted an authorized request and has other mesh neighbors.

Processing block 130 states resubmitting a request for control channel change to a different control channel when a control channel change is not authorized.

Figure 5:
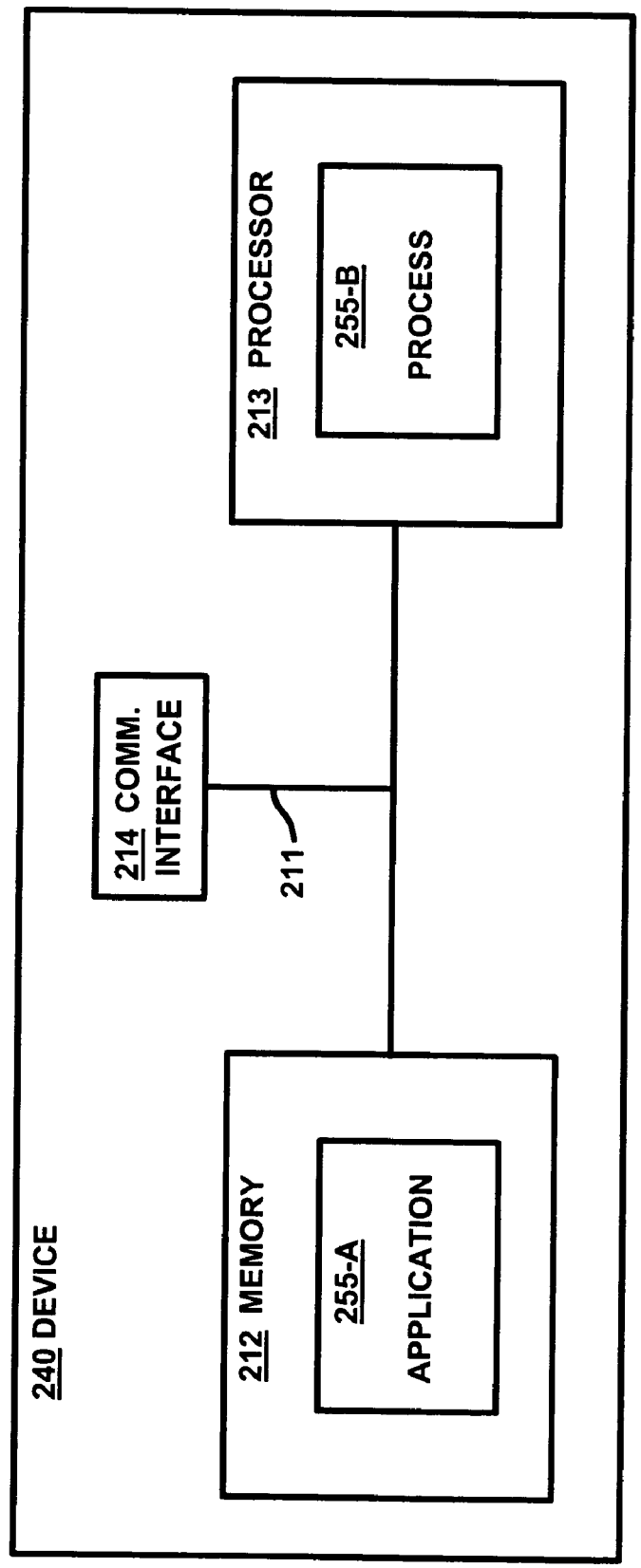
FIG. 5 depicts an example computer system architecture for interference avoidance from independent systems in a mesh in accordance with embodiments of the invention.

Referring now to FIG. 5, example architectures of a computer system that is configured as a mesh point 240 are shown. The mesh point 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the mesh point in order to produce a corresponding process 255-B. In other words, the process 255-B represents one or more portions of the agent application 255-A performing within or upon the processor 213 in the mesh point.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of avoiding interference from independent stations in a mesh comprising:
in a mesh network, requesting by a first Mesh Point (MP) operating on a same channel as an independent Access Point (AP) a change of control channel for said first MP;
wherein said requesting a change of control channel for said first MP comprises splicing the control channel to operate on two different physical channels in order to avoid interference from mesh-independent stations;
wherein a second MP receiving the request for a control channel change from said first MP performs one of the group consisting of accepting the request for a control channel change, forwarding the request for a control channel change, and declining the request for a control channel change;
considering, by said first MP, said control channel request as authorized when the request is accepted and one of the group consisting of:
tuning a control radio to the requested channel by said second MP and wherein said second MP forwards an authorized request;
tuning the control radio to the requested channel by said second MP when said second MP accepts an authorized request and has no other mesh MPs; and
tuning a control radio to the requested channel and using said requested channel for control traffic by said second MP when said second MP accept the authorized request and has other mesh MPs.

2. The method of claim 1 wherein said avoiding mesh traffic channels serving said independent AP comprises limiting channel selection within a set of permissible channels for said first MP.

3. The method of claim 2 wherein said limiting channel selection within a set of permissible channels comprises maintaining a set of permissible channels for said first MP that are not heavily loaded with non-mesh traffic and that are not heavily loaded with traffic from a non-mesh-associated Basic Service Set (BSS).

4. The method of claim 3 further comprising monitoring said channels to avoid channels from being included in said permissible channel set that are heavily loaded with non-mesh traffic and that are heavily loaded with traffic from a non-mesh-associated BSS.

5. The method of claim 3 further comprising removing a channel from a permissible channel set when said channel is chosen by an AP powering on.

6. The method of claim 3 further comprising maintaining a NAV by said first MP on all channels of the permissible channel set.

7. The method of claim 6 further comprising updating said NAV with at least one of the group consisting of NAV setting requests transmitted on a control channel for the channel reserved and NAV setting requests transmitted on each traffic channel by any nodes operating on said channel and that are received by a MT radio while tuned to said channel.

8. The method of claim 2 further comprising avoiding collisions when switching channels by performing carrier sensing before transmitting and performing back off if a transmission is sensed on channel being switched to.

9. The method of claim 1 further comprising said second MP notifying said first MP that the request is one the group consisting of accepted by said second MP, declined by said second MP, and a request forwarded by said second MP to other MPs was accepted.

10. The method of claim 9 wherein said first MP considers a request as accepted when all Mps the request was sent to accept the request.

11. The method of claim 1 further comprising resubmitting a request for control channel change to a different control channel when a control channel change is not authorized.

12. The method of claim 1 wherein said mesh network includes a plurality of sub-meshes operating on different control channels, wherein one mesh point is common to any two sub-meshes, said mesh point common to any two sub-meshes having at least two radios.

13. The method of claim 12 wherein said mesh point common to any two sub-meshes uses one of its radios for control traffic exchanged one sub-mesh, and another radio for control traffic exchanged with another sub-mesh and wherein mesh traffic to or from said mesh point common to any two sub-meshes can use either of the two channels.

14. A first mesh point (MP) comprising:
   a memory;
   a processor;
   a communications interface;
   an interconnection mechanism coupling the memory, the processor and the communications interface; and
   wherein the memory is encoded with application for avoiding interference from independent stations in a mesh that when performed on the processor, provides a process for processing information, the mesh point capable of performing the operations of:
      requesting a change of control channel for said first MP;
   wherein said requesting a change of control channel for said first MP comprises splicing the control channel to operate on two different physical channels in order to avoid interference from mesh-independent stations;
   wherein a second MP receiving the request for a control channel change from said first MP performs one of the group consisting of accepting the request for a control channel change, forwarding the request for a control channel change, and declining the request for a control channel change;
   considering by said first MP said control channel request as authorized when the request is accepted; and
   considering, by said first MP, said control channel request as authorized when the request is accepted and one of the group consisting of:
      tuning a control radio to the requested channel by said second MP and wherein said second MP forwards an authorized request;
      tuning the control radio to the requested channel by said second MP when said second MP accepts an authorized request and has no other mesh MPs; and
      tuning a control radio to the requested channel and using said requested channel for control traffic by said second MP when said second MP accept the authorized request and has other mesh MPs.

15. The first mesh point of claim 14 wherein said mesh point is further capable of avoiding mesh traffic channels serving said independent AP comprises limiting channel selection within a set of permissible channels for said first MP.

16. The first mesh point of claim 14 wherein said first mesh point is further capable of maintaining a NAV by said first MP on all channels of the permissible channel set.

17. The mesh point of claim 14 wherein said first mesh point is further capable of updating said NAV with at least one of the group consisting of NAV setting requests transmitted on a control channel for the channel reserved and NAV setting requests transmitted on each traffic channel by any nodes operating on said channel and that are received by a MT radio while tuned to said channel.

18. The first mesh point of claim 14 wherein said mesh point is further capable of resubmitting a request for control channel change to a different control channel when a control channel change is not authorized.

* * * * *